United States Patent
Yokohata et al.

(10) Patent No.: US 7,017,399 B2
(45) Date of Patent: Mar. 28, 2006

(54) PREDICTIVE ANALYSIS METHOD AND SYSTEM FOR ENGINE PERFORMANCE AND CONTROL PROGRAM FOR USE IN THE SAME

(75) Inventors: Hideaki Yokohata, Hiroshima (JP); Yoshiharu Ueki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 29 days.

(21) Appl. No.: 10/769,862

(22) Filed: Feb. 3, 2004

(65) Prior Publication Data

US 2004/0220716 A1 Nov. 4, 2004

(30) Foreign Application Priority Data

Feb. 5, 2003 (JP) ............................. 2003-027826

(51) Int. Cl.
G01M 15/00 (2006.01)
(52) U.S. Cl. ...................................................... 73/116
(58) Field of Classification Search ................ 73/116, 73/117.1, 117.2, 117.3, 118.1, 119 R, 118.2, 73/865.6; 701/29; 703/8, 9
See application file for complete search history.

(56) References Cited

U.S. PATENT DOCUMENTS

| | | | | |
|---|---|---|---|---|
| 5,889,205 | A * | 3/1999 | Treinies et al. | 73/118.2 |
| 6,178,373 | B1 * | 1/2001 | Davis et al. | 701/104 |
| 6,397,669 | B1 | 6/2002 | Raichle et al. | |
| 6,460,409 | B1 * | 10/2002 | Soliman et al. | 73/118.2 |
| 6,640,622 | B1 * | 11/2003 | Soliman et al. | 73/118.2 |
| 6,662,640 | B1 * | 12/2003 | Yagi | 73/118.2 |
| 6,688,166 | B1 * | 2/2004 | Gerhard et al. | 73/118.2 |
| 6,718,822 | B1 * | 4/2004 | Soliman et al. | 73/118.2 |
| 6,928,360 | B1 * | 8/2005 | Baeuerle et al. | 701/102 |
| 6,941,249 | B1 * | 9/2005 | Miller et al. | 703/1 |
| 2002/0107630 | A1 * | 8/2002 | Yagi | 701/102 |
| 2002/0152016 | A1 * | 10/2002 | Burgio et al. | 701/108 |
| 2003/0005756 | A1 * | 1/2003 | Soliman et al. | 73/116 |
| 2004/0255882 | A1 * | 12/2004 | Branyon et al. | 123/70 R |
| 2005/0131620 | A1 * | 6/2005 | Bowyer | 701/108 |

FOREIGN PATENT DOCUMENTS

JP 2002-148147 5/2002

\* cited by examiner

*Primary Examiner*—Eric S. McCall
(74) *Attorney, Agent, or Firm*—Nixon Peabody LLP; Donald R. Studebaker

(57) ABSTRACT

In a computer system for analyzing the flow of an intake/exhaust gas of, for example, a four-cycle multi-cylinder engine through application of CFD, the dimension of a space where the flow of the intake/exhaust gas is analyzed can be selected with respect to each of four processes, that is, intake, compression, expansion and exhaust processes, of each cylinder (in selecting step S1), and a physical model for simulating the flow of the intake/exhaust gas from a part of an intake system to a part of an exhaust system of the engine in the dimension selected with respect to each of the four processes is set (in model setting steps S2, S31, S41 and S51). The flow of the intake/exhaust gas is subjected to a CFD operation using the physical model, and chemical reactions caused in combustion is simulated (in operating steps S33, S43 and S53), so as to output an output about engine performance on the basis of the results of these simulation operations. Thus, while keeping sufficiently high accuracy in the analysis, time required for the CFD operation can be reduced as much as possible, resulting in improving the utility as a design/development tool.

18 Claims, 8 Drawing Sheets

FIG. 5

```
C7H16 + O2      = C7H15-1 + HO2
C7H16 + O2      = C7H15-2 + HO2
C7H16 + H       = C7H15-1 + H2
C7H16 + H       = C7H15-2 + H2
C7H16 + OH      = C7H15-1 + H2O
C7H16 + OH      = C7H15-2 + H2O
C7H16 + HO2     = C7H15-1 + H2O2
C7H16 + HO2     = C7H15-2 + H2O2
C7H16 + CH3     = C7H15-1 + CH4
C7H15-1 + O2    = C7H15O2
C7H15-2 + O2    = C7H15O2
C7H15O2         = C7H14O2H
C7H14O2H + O2   = C7H14O2HO2
C7H14O2HO2      = C7KET21 + OH
C7KET21         = C5H11CO + CH2O + OH
C5H11CHO + O2   = C5H11CO + HO2
C5H11CHO + OH   = C5H11CO + H2O
                :
                :
                :
```

3000 or more elementary reactions

US 7,017,399 B2

PREDICTIVE ANALYSIS METHOD AND SYSTEM FOR ENGINE PERFORMANCE AND CONTROL PROGRAM FOR USE IN THE SAME

BACKGROUND OF THE INVENTION

The present invention relates to a predictive analysis method and a predictive analysis system for predicting engine performance through analysis of movement of a working fluid by using CFD (Computational Fluid Dynamics) and a control program for use in the predictive analysis method and system.

In order to evaluate the performance of an engine, a transmission or the like, a variety of measurement and test methods have been conventionally proposed as disclosed in, for example, Patent Document 1 (National Publication of translated version No. 2002-526762). Also, Patent Document 2 (Japanese Laid-Open Patent Publication No. 2002-148147) discloses a simulation system capable of evaluating the performance of a power train before completing the development of an engine.

As a technique for such a simulation, the performance of an engine is generally predicted on the basis of the result of a movement analysis of an intake gas or a combustion gas, that is, a working fluid, through application of the CFD. Specifically, a virtual experiment (simulation) for simulating, for example, a complicated flow of an intake gas sucked from an intake port into a combustion chamber through numerical calculation using a computer, and, for example, the shape of the intake port is determined on the basis of the result of the simulation. Thus, the number of development man-hour spent on trial manufacture and repeated experiments can be reduced so as to realize efficient design and development.

In particular, owing to recent remarkable improvement of calculation capabilities of a computer, a complicated shape of an intake port or the like and a flow of an intake gas within the intake port can be three dimensionally simulated. Therefore, there is no need to actually experimentally manufacture an engine in order to predict change of flowing resistance of the intake gas or volumetric efficiency of a cylinder caused by changing the shape of the intake port.

However, there is no simulation system capable of three dimensional simulation of all the flows of an intake gas and an exhaust gas involved in the running of an engine. This is because, no matter how much the calculation capabilities of a computer has been improved, it is unrealistic to three dimensionally simulate all of the shapes of intake gas passages different among respective cylinders of a multi-cylinder engine, the states of gas exchange in combustion chambers and flows of a burnt gas blowing out from each combustion chamber to an exhaust system.

Accordingly, in the case where the whole performances (such as an output, drivability and emission) of an engine are to be predicted, for example, experiment data obtained by examining various performance characteristics of the engine is accumulated so as to construct a database in which these performance characteristics are statistically correlated with one another. Also, simulation is performed by using a simple physical model for simulating a flow of an intake gas or an exhaust gas as a one dimensional flow. Thus, findings obtained on the basis of the database of the performance characteristics and the result of the one dimensional simulation are combined for predicting the performance of the engine.

Furthermore, in addition to the one dimensional simulation using the simple model, simulation for three dimensionally simulating, for example, an intake gas in an intake port alone is performed, and the results of these simulations are combined so as to improve the accuracy of the analysis. However, a CFD analysis program for such a three dimensional flow is generally difficult to deal with, and a large number of know-how is necessary for the setting for improving the accuracy. Therefore, a burden of a specialized analysis expert is increased, so that the development may be delayed due to insufficient manpower.

In consideration of this problem, the present inventors have developed a system in which a simple physical model for simulating the whole operation of an engine by using one dimensional movement of a working fluid (i.e., a flow of an intake/exhaust gas) as described above is used and merely a part of the physical model can be replaced with a three dimensional model for a CFD operation. Also, in this system, a user-friendly interface is employed and complicated setting peculiar to a three-dimensional CFD analysis program is automated, so that the system can be easily dealt with by any person that is not a specialized analysis expert.

However, even when the flow of the working fluid in merely a part of the engine is simulated as a three dimensional flow as in the aforementioned system, the computational complexity is still large, and hence, it is difficult to obtain the analysis result within a practical time at desired accuracy. Specifically, for example, in a four-cycle four-cylinder engine, in the case where a model for simulating a flow of the intake gas from a surge tank to the inlet of each independent intake gas passage as a three dimensional flow and simulating the other flows as one dimensional flows (see FIG. 3) is used, it is actually necessary to simulate the flow from the surge tank to the independent intake gas passage as the three dimensional flow merely when the corresponding cylinder is in an intake process. Accordingly, if the CFD operation using the one and three dimensional complex model is performed over the whole combustion cycle of the engine, the operation includes a large number of unnecessary calculations, which means that there is room for increasing the operation speed.

The present invention was devised in consideration of the aforementioned disadvantages, and an object is, in analysis of the movement of a working fluid of an engine through application of the CFD, improving the utility as a design/development tool by reducing time required for the CFD operation as much as possible with the analysis accuracy kept sufficiently high.

SUMMARY OF THE INVENTION

In order to achieve the object, attention is paid to a fact that the accuracy of the CFD operation required for the analysis of engine performance largely depends upon which process in the combustion cycle the engine is in, and as means of this invention for overcoming the disadvantages, the dimension of a space where the movement of a working fluid is analyzed can be set with respect to each of an intake process, a compression process, an expansion process and an exhaust process.

A first aspect of the invention is a predictive analysis method for predicting performance of an engine by analyzing movement of a working fluid of the engine through application of CFD, including the steps of dividing a combustion cycle of the engine into four processes of intake, compression, expansion and exhaust processes, and setting, with respect to each of the four processes, a dimension of a space where the movement of the working fluid is analyzed; analyzing the movement of the working fluid at least from a part of an intake system to a part of an exhaust system of the engine by performing a CFD operation in the dimension having been set with respect to each of the four processes; and predicting the performance of the engine on the basis of a result of analysis.

In the case where the movement of a working fluid such as an intake gas or an exhaust gas of an engine is analyzed by this method, the combustion cycle of the engine is first divided into four processes of the intake, compression, expansion and exhaust processes, and the dimension of a virtual space where the movement of the working fluid is described is set to, for example, any of zero through three dimensions with respect to each process. Specifically, in the case of a four-cycle engine, with respect to each of the intake, compression, expansion and exhaust strokes distinguished depending upon the operation of a piston, it is selected whether the flow of the working fluid is assumed to be a zero dimensional flow, a one dimensional flow, a two dimensional flow or a three dimensional flow. It is noted that assuming to be a zero dimensional flow herein means assuming that the working fluid does not move, and specifically means, for example, assuming that an air fuel mixture within a combustion chamber of a cylinder is uniformly increased in its pressure and volume in the expansion stroke.

Alternatively, in the case of a two-cycle engine, for example, a period from a time when a scavenging port communicated with a combustion chamber is opened in accordance with the lowering of a piston through a time when the piston passes the bottom dead center and starts to elevate to a time when the scavenging port is closed is defined as an intake process. Furthermore, a period thereafter to a time when the piston reaches the top dead center is defined as a compression process, a period from thereafter to a time when an exhaust port is opened due to the lowering of the piston resulting from the combustion is defined as an expansion process, and an ultimate period from a time when the piston is further lowered to a time when the scavenging port is opened is defined as an exhaust process.

Alternatively, taking into consideration that exhaust of the burnt gas is accelerated due to fresh air flowing through the scavenging port after the scavenging port is opened, a period from a time when the scavenging port is opened until a given time elapses may be defined as the exhaust process, with a period thereafter to the time when the scavenging port is closed defined as the intake process.

With respect to each of the intake, compression, expansion and exhaust processes of the engine thus defined, a physical model for simulating the movement of the working fluid in the dimension set as described above is constructed, and the flow of the working fluid at least from a part of the intake system to a part of the exhaust system obtained during the running of the engine is described by the CFD operation using the physical model. At this point, for example, when the engine is proceeded from the intake process to the compression process and the dimension of the flow of the intake gas, that is, the working fluid, is changed accordingly, the values of variables such as a pressure, a density and a velocity used for describing the flow are transformed in accordance with the change of the dimension.

When the flow of the intake or exhaust gas at least from a part of the intake system to a part of the exhaust system of the engine can be described with desired accuracy in this manner, physical characteristics such as volumetric efficiency and a loss factor of the engine can be obtained on the basis of the description, thereby predicting the performance characteristics such as engine output and fuel expenses. At this point, among the intake, compression, expansion and exhaust processes of the engine, merely a process in which the flow of the working fluid is significant for predicting the engine performance is operated by assuming the flow as a three dimensional flow, and the flow in the other processes is operated as a one dimensional flow. Thus, while keeping sufficiently high accuracy in the performance prediction, necessary computational complexity can be largely reduced, so as to reduce the time required for the analysis.

A second aspect of the invention is a predictive analysis system for predicting performance of an engine by analyzing movement of a working fluid of the engine through application of CFD. This system includes selecting means for allowing an operator to select a dimension of a space where the movement of the working fluid is analyzed with respect to each of four processes of intake, compression, expansion and exhaust processes in a combustion cycle of the engine; model setting means for setting a physical model used for simulating the movement of the working fluid at least from a part of an intake system to a part of an exhaust system of the engine in the dimension selected with respect to each of the four processes; and operating means for describing the movement of the working fluid of the engine through a CFD operation using the physical model.

In this system, when the dimension of a space where the movement of a working fluid is analyzed is selected from, for example, zero through three dimensions with respect to each of the intake, compression, expansion and exhaust processes of the engine, a physical model is set by the model setting means on the basis of the result of the selection, and the operating means performs the CFD operation. Thus, the predictive analysis method according to the first aspect is executed. As a result, while keeping sufficiently high accuracy in the prediction of the engine performance, the time required for the necessary CFD operations can be reduced, so as to improve the utility of the system as a design/development tool.

More specifically, it may be selectable by the selecting means whether the movement of the working fluid is assumed to be a one dimensional flow or a three dimensional flow in the intake process of the engine (according to a third aspect). Alternatively, it may be selectable by the selecting means whether the movement of the working fluid is assumed to be a one dimensional flow or a three dimensional flow in the exhaust process of the engine (according to a fourth aspect). In order to support the design/development of, for example, an intake system of an engine, it is significant to accurately predict the flow of an intake gas in particular, and hence, it is necessary to analyze the flow in the intake process as a three dimensional flow in this case. Alternatively, in supporting the design of an exhaust system, the flow in the exhaust process is analyzed as a three dimensional flow in order to accurately predict the flow of an exhaust gas in particular. Then, the flow in the other processes is analyzed as a one dimensional flow, and thus, the computational complexity necessary for the whole combustion cycle of the engine can be largely reduced.

Alternatively, it may be selectable by the selecting means whether the movement of the working fluid is assumed to be a one dimensional flow or a three dimensional flow in the intake and exhaust processes of the engine, and the model setting means sets a physical model in the selected dimension with respect to the intake or exhaust process of the engine and sets a zero dimensional physical model with respect to the compression and expansion processes assuming that the working fluid does not move at least in a combustion chamber of the engine in the compression and expansion processes (according to a fifth aspect).

It is very difficult to three dimensionally simulate very complicated change of the flow involved in the combustion in the expansion process of the engine, and change of the flow remaining in a cylinder in the compression process mainly affects the combustion. Therefore, the movement of the gas once enclosed in a combustion chamber is ignored and it is assumed that the gas is changed in its components through the compression and the combustion and is uniformly increased in its pressure and volume. Thus, the computational complexity can be largely reduced.

The model setting means preferably sets a three dimensional physical model (analytic model) for a section of a portion extending from at least a part of the intake system to a part of the exhaust system of the engine and sets a one dimensional physical model for another section of the portion (according to a sixth aspect). Specifically, a three dimensional model is used for merely a section in which the flow of the working fluid of the engine is desired to accurately predict and a one dimensional model is used for the other sections, resulting in reducing the computational complexity.

The predictive analysis system may further include a database where design CAD data of engines are accumulated, and the model setting means may construct a physical model on the basis of data read from the database (according to a seventh aspect). Thus, a physical model to be used in the CFD operation can be easily constructed by using design CAD data.

Furthermore, the predictive analysis system may further include a database of component models each of which simulates a basic shape of a given section for allowing the working fluid of the engine to pass and is changeable in a dimension, a shape and at least one of physical characteristic values, the model setting means may accept input of data about the dimension and at least one of physical characteristic values of the given portion, reads a corresponding component model from the database, and construct a physical model for use in the CFD operation by modifying the component model on the basis of the input data (according to an eighth aspect).

Thus, a model of the engine for use in the CFD operation can be easily constructed by combining some component models and modifying their dimensions and shapes, and a model once constructed can be easily modified. In addition, the database can be prevented from being excessively large.

When the dimension of the space where the movement of the working fluid of the engine is simulated is changed, the operating means transforms values of variables used for describing the movement of the working fluid in accordance with the change of the dimension (according to a ninth aspect). Specifically, when the flow of the working fluid is changed, for example, from a one dimensional flow to a three dimensional flow, variables indicating, for example, a state of the flow that is uniform on a plane perpendicular to the flow are transferred as initial values of the three dimensional flow. On the other hand, when the flow is changed from a three dimensional flow to a one dimensional flow, the variables are respectively averaged on the plane perpendicular to the flow to be used for the one dimensional flow.

The predictive analysis system preferably further includes outputting means for outputting an output about the performance of the engine on the basis of a result of the CFD operation performed by the operating means (according to a tenth aspect). Specifically, when the flow of, for example, the intake or exhaust gas at least from a part of the intake system to a part of the exhaust system is output to a display or the like to be displayed, an engineer can intuitively grasp, for example, the relationship between the shape of the intake gas passage and deviation of the intake gas flow at a glance of the display.

Alternatively, on the basis of the analysis result of the flow of the intake gas flowing into the cylinder of the engine, for example, intake gas filling efficiency of the cylinder may be calculated so as to be output. When such a quantitative output about the engine performance can be thus obtained, the utility of the system as the design/development tool can be further improved.

An eleventh aspect of the invention is a control program for a computer system for predicting performance of an engine by analyzing movement of a working fluid of the engine through application of CFD. This program includes a selecting step of selecting a dimension of a space where the movement of the working fluid is analyzed with respect to each of four processes of intake, compression, expansion and exhaust processes in a combustion cycle of the engine; a model setting step of setting a physical model for use in simulating the movement of the working fluid from at least a part of an intake system to a part of an exhaust system of the engine in the dimension selected with respect to each of the four processes; and an operating step of describing the movement of the working fluid of the engine by a CFD operation using the physical model.

When a computer is controlled in accordance with this program, this computer system works as the predictive analysis system for engine performance according to the second aspect of the invention, resulting in attaining the same effects as those of the second aspect.

It may be selectable in the selecting step whether the movement of the working fluid is assumed to be a one dimensional flow or a three dimensional flow in the intake process of the engine (according to a twelfth aspect). Thus, the effect the same as that of the third aspect can be attained.

It may be selectable in the selecting step whether the movement of the working fluid is assumed to be a one dimensional flow or a three dimensional flow in the exhaust process of the engine (according to a thirteenth aspect). Thus, the effect the same as that of the fourth aspect can be attained.

Furthermore, it may be selectable in the selecting step whether the movement of the working fluid is assumed to be a one dimensional flow or a three dimensional flow in the intake and exhaust processes of the engine, and in the model setting step, a physical model of the selected dimension may be set with respect to the intake or exhaust process of the engine and a zero dimensional physical model may be set with respect to the compression and the expansion processes by assuming that the working fluid does not move at least in a combustion chamber of the engine in the compression and expansion processes (according to a fourteenth aspect). Thus, the effect the same as that of the fifth aspect can be attained.

In the model setting step, a three dimensional physical model may be set for a section of a portion extending from at least a part of the intake system to a part of the exhaust system of the engine and a one dimensional physical model may be set for another section of the portion (according to a fifteenth aspect). Thus, the effect the same as that of the sixth aspect can be attained.

In the model setting step, desired data may be read from a database where design CAD data of engines are accumulated, and a physical model may be constructed on the basis of data read from the database (according to a sixteenth aspect). Thus, the effect the same as that of the seventh aspect can be attained.

Furthermore, a database of component models each of which simulates a basic shape of a given section for allowing the working fluid of the engine to pass and is changeable in a dimension, a shape and at least one of physical characteristic values may be prepared, the control program further may include an inputting step of inputting data about the dimension and at least one of physical characteristic values of the given section, and in the model setting step, a corresponding component model may be read from the database, and a physical model for use in the CFD operation may be constructed by modifying the component model on the basis of the input data (according to a seventeenth aspect). Thus, the effect the same as that of the eighth aspect can be attained.

When the dimension of the space where the movement of the working fluid of the engine is simulated is changed, the operating step preferably includes a data transforming substep of transforming values of variables used for describing the movement of the working fluid in accordance with the change of the dimension (according to an eighteenth aspect). Thus, the effect the same as that of the ninth aspect can be attained.

Moreover, the control program may further include an outputting step of outputting an output about the performance of the engine on the basis of a result of the CFD operation performed in the operating step (according to a nineteenth aspect). Thus, the effect the same as that of the tenth aspect can be attained.

As described so far, in the predictive analysis method and system for engine performance and the control program for use in the same according to this invention, in the case where the flow of, for example, an intake/exhaust gas of an engine is analyzed through the application of the CFD and the engine performance is predicted on the basis of the result of the analysis, since the necessary accuracy of the CFD operation is largely different among the intake, compression, expansion and exhaust processes, the dimension of a space where the movement of the working fluid is analyzed can be selected with respect to each of the processes. Accordingly, while keeping prediction accuracy for the engine performance, the necessary computational complexity is largely reduced so as to reduce the time required for the analysis. As a result, the utility as a design/development tool can be sufficiently improved.

BRIEF DESCRIPTION OF THE DRAWINGS

FIG. 5 is an explanatory diagram of examples of chemical reactions involved in combustion;

DETAILED DESCRIPTION OF THE INVENTION

Preferred embodiments of the invention will now be described with reference to the accompanying drawings.

(Whole Architecture of System)

Figure 1:
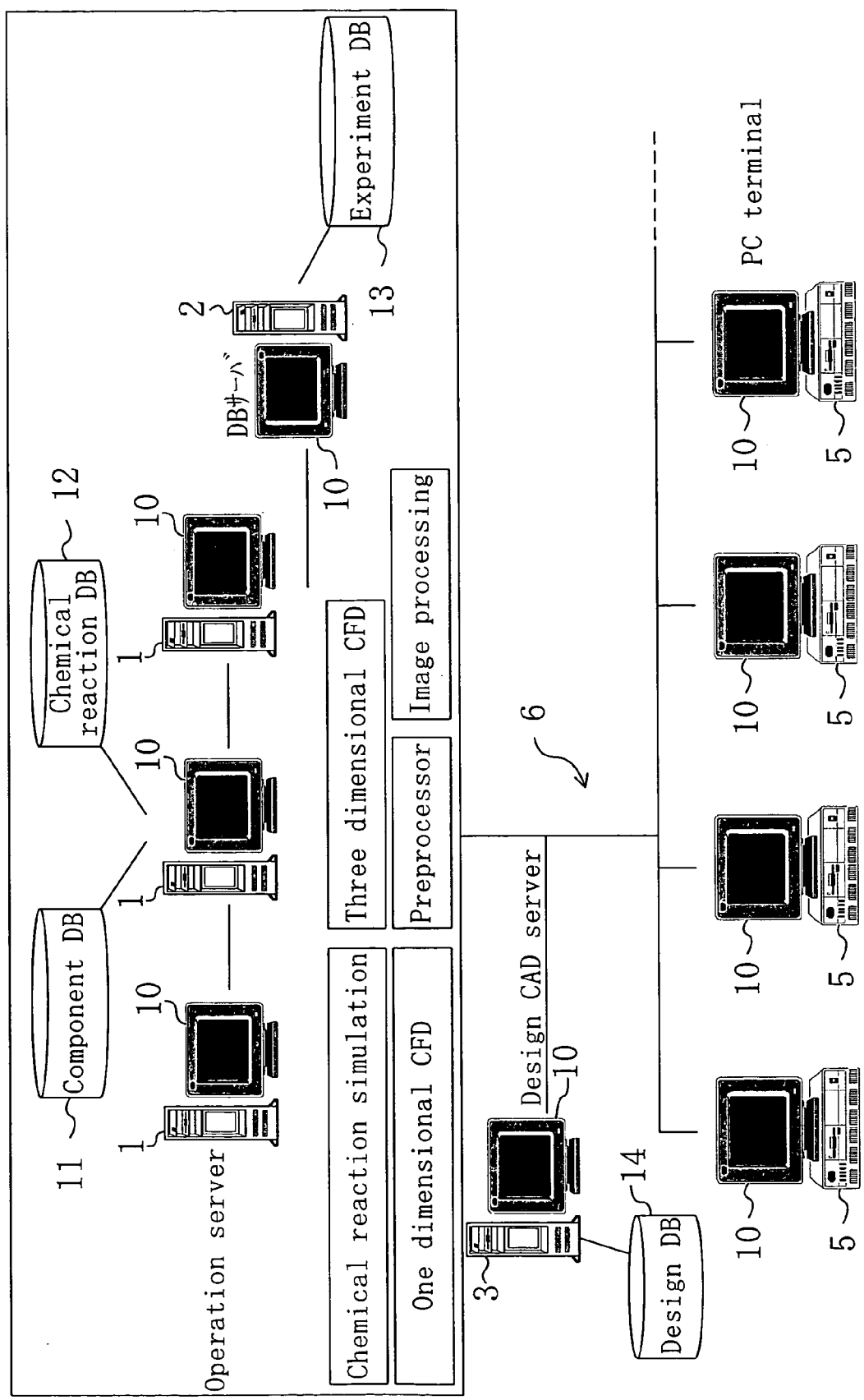
FIG. 1 is a diagram for showing the whole architecture of a predictive analysis system A for engine performance according to an embodiment of the invention.

FIG. 1 is a conceptual diagram for showing the whole architecture of a predictive analysis system A for engine performance according to an embodiment of the invention. In this system, flows of an intake gas and an exhaust gas, that is, a working fluid of an engine, are described by using a one dimensional or three dimensional CFD operation, and combustion within a cylinder is described by using chemical reaction formulas, so that these descriptions can be combined for performing running simulation of the engine. As a characteristic of this system, data transfer between the one dimensional CFD operation and the three dimensional CFD operation and data transfer between the CFD operation and chemical reaction simulation (chemical reaction SIM) are both automated so that the flow of, for example, an intake/exhaust gas from a throttle valve to a catalytic converter through cylinders can be dynamically analyzed. Thus, simulation with very high accuracy can be easily performed.

In FIG. 1, a reference numeral 1 denotes a computer for mainly executing a CFD operation, and in this embodiment, a plurality of high speed server computers connected in parallel (hereinafter referred to as the operation servers) are used for coping with large computational complexity of particularly the three dimensional CFD operation. Each of the operation servers 1 includes a storage device such as a hard disk drive and is connected to an image display device 10 such as a display, and although not shown in the drawing, is connected to an output device such as a printer and to input devices such as a keyboard and a mouse to be used in an input operation carried out by an operator. The storage device at least stores one dimensional and three dimensional CFD operation programs for simulating a flow of the intake/exhaust gas, a dedicated preprocessor for constructing physical models for used in the CFD operation programs, a chemical reaction simulation program for simulating a combustion state, and an image processing program for displaying the result of the simulation performed in accordance with each of the programs.

The operation servers 1 can make an access to a component database (DB) 11 by a general method during the operation if necessary. The component DB 11 previously stores templates, which are classified into respective sections of the engine, of physical models (analytic models or simulation models) of the engine for use in the one dimensional and three dimensional CFD operations, and can further store models newly constructed by the preprocessor. A template of the physical model is a component model that is used for simulating the basic shape of a section through which an intake or exhaust gas passes, such as a surge tank, an independent intake gas passage or an intake port of the intake system, or an exhaust port, an exhaust manifold or an EGR passage of the exhaust system, and that is changeable in the dimension, the shape, the material, the surface state and the physical characteristic values such as thermal conductivity. In this embodiment, this component model is designated as a template component.

Since the component DB 11 of the template components changeable in the dimension, the shape and the physical characteristic values is thus provided, a physical model of the engine to be used for the CFD operation can be very easily constructed simply by combining a template component read from the component DB 11 with a dimension and the like input. Also, when a model thus constructed is stored in the component DB 11, the model can be easily modified if necessary, so as to easily cope with design change of the engine.

Furthermore, the operation servers 1 can make an access to a chemical reaction DB 12 by a general method during the operation if necessary. The chemical reaction DB 12 stores typical gas components (chemical seeds) included in an intake gas to be filled for combustion in a combustion chamber within a cylinder of the engine, and the stored gas components are previously grouped correspondingly to groups of various physical quantities indicating the states within the cylinder. Accordingly, in accordance with the state within the cylinder obtained as a result of the CFD operation, a group of gas components corresponding to the state is read from the chemical reaction DB 12, and chemical reactions of the gas components are simulated so that the combustion state can be simulated, which will be described in detail later.

A reference numeral 2 shown in FIG. 1 denotes a computer (hereinafter referred to as an experiment DB server) connected to a database (DB) 13 (experiment DB), which stores experiment data mainly about item values, physical characteristics and performance characteristics of the engine correlated with one another, and manages the data. Specifically, data accumulated during past experiments and developments related to engines and transmissions are arranged by a known statistical analysis method, so as to be stored in the experiment DB 13 as experimental equations for correlating the item values of the engine, its physical characteristics (such as volumetric efficiency, combustion characteristics and a loss factor) and its performance characteristics (such as output, combustion and emission). On the basis of these experimental equations, for example, performance characteristics of an engine can be predicted from the item values and the physical characteristics.

Moreover, a reference numeral 3 shown in FIG. 1 denotes a computer of a three dimensional CAD system for supporting the design of an engine (hereinafter referred to as a design CAD server). The design CAD server 3 executes a general CAD program for machine design and structure analysis, and can make an access to a design database (DB) 14 (design DB) by a general method during its operation if necessary so as to invoke design CAD data of the engine, and can modify the invoked data and store the modified data in the design DB 14. Specifically, the design DB 14 stores three dimensional design CAD data for various engines to be individually taken out with respect to each section of an engine.

A reference numeral 5 shown in FIG. 1 denotes a terminal (PC terminal) of a personal computer. A plurality of PC terminals 5 are installed in each of a design department, a development department, an experiment department and the like for a power train, and all the PC terminals 5 are connected to be capable of two-way communication to the operation servers 1, the experiment DB server 2 and the design CAD server 3 through a network 6 using an optical communication cable or the like. When a system control program is executed in each PC terminal 5 by an operator, the PC terminal 5 is connected to (logged in) the operation servers 1 and the like through the network 6, so as to construct what is called a server-client environment, and thus, the PC terminal 5 sends and receives commands and files mainly to and from the operation servers 1, thereby executing the running simulation of the engine.

It is noted that each of the experiment DB server 2, the design CAD server 3 and the PC terminals 5 also includes a storage device such as a hard disk drive similarly to the operation servers 1 and is connected to a display 10, an output device and an input device.

(CFD Operation)

Next, the one dimensional and three dimensional CFD will be described by exemplifying the running simulation of a four-cycle four-cylinder gasoline engine.

Figure 2A:
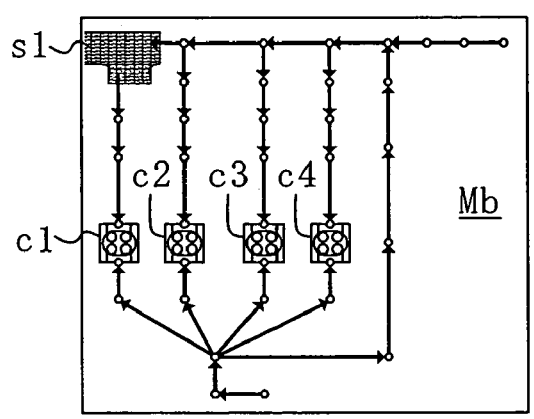
FIGS. 2A, 2B, 2C and 2D are diagrams of an example of engine models for use in a CFD operation.
Figure 2B:
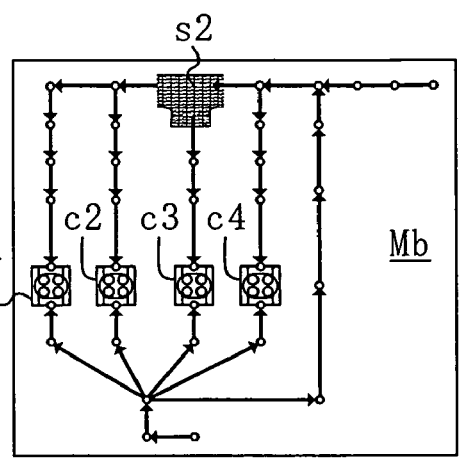
Figure 2D:
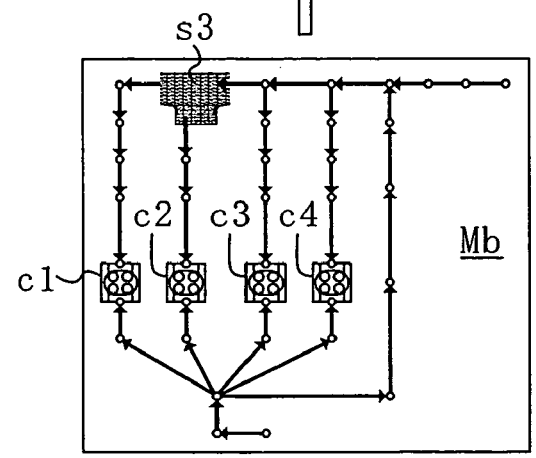
Figure 2C:
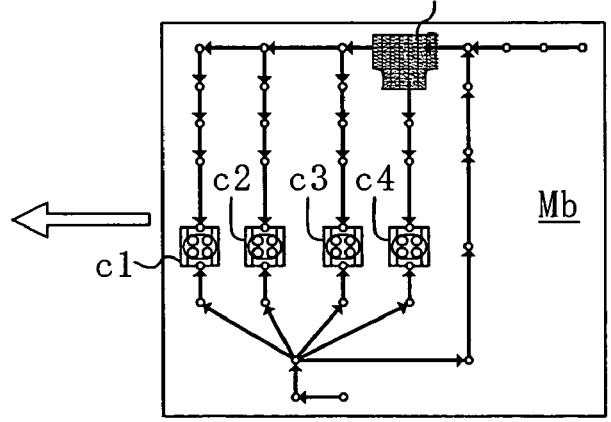

In this case, in order to reduce the time required for the CFD operations as much as possible, the one dimensional CFD is basically employed while the three dimensional CFD is substituted in a given stroke (process) in a selected section of the engine if necessary. Specifically, for example, as shown in FIGS. 2I through 2IV, a physical model Mb for the one dimensional CFD extending from a throttle valve (not shown) disposed in the upstream of an intake gas passage of the engine through combustion chambers of first through fourth cylinders c1 through c4 to a catalytic converter (not shown) is used as a basic model, and a three dimensional model is successively substituted in sections s1 through s4 of a surge tank respectively corresponding to the cylinders c1 through c4 when the respective cylinders c1 through c4 are in an intake stroke.

More specifically, basically in the one dimensional model Mb shown in the drawings, independent intake gas passages from the surge tank to the respective cylinders and a common intake gas passage from the throttle valve to the surge tank are expressed as an assembly of tubes (shown as arrows in the drawings), and similarly, independent exhaust gas passages from the respective cylinders to a concentrated portion of the exhaust manifold and a common exhaust gas passage from the concentrated portion to the inlet of the catalytic converter are expressed as an assembly of tubes. Furthermore, an EGR passage for recirculating a part of the exhaust gas from the concentrated portion to the upstream of the surge tank and the surge tank itself are expressed as assemblies of tubes. Also, each of the first through fourth cylinders c1 through c4 is expressed as a capacity variable tank.

In such a one dimensional model Mb, each of the flows of the intake gas and the exhaust gas passing through the tubes is assumed to be a one dimensional flow of a compressible fluid, and known expressions of conservation of mass, conservation of momentum and conservation of energy are solved through numerical calculation for respective parameters indicating the state of the flow, such as a pressure p, a density $\rho$, a velocity u and a temperature T. Thus, the state of the flow momently changing can be described. Also, for solving the conservation expressions, it is assumed, with respect to each tank, that the state therein is uniform and a fluid entering from the tube is instantly homogeneously distributed therein, and a connection between the tubes or between the tube and the tank is provided with appropriate boundary conditions. It is noted in solving each of the conservation expressions that the extent of the bend of each tube and the influence of friction and heat loss on the inner wall of each tube are preferably considered.

Under these conditions, for example, when the first cylinder c1 is in the intake stroke, a section from a part of the surge tank corresponding to the first cylinder c1 to the inlet of the independent intake gas passage is replaced with a three dimensional model s1, so that a flow of the intake gas flowing through this section can be simulated as a three dimensional flow. In other words, the shape of the inner walls of the section s1 of the surge tank and the inlet part of the independent intake gas passage are expressed by using a three dimensional model, and the flow of the intake gas flowing along the inner walls is described by using a three dimensional space.

At this point, when EGR (Exhaust Gas Recirculation) is performed, the intake gas includes fresh air (new air) externally supplied to the engine and an exhaust gas (EGR gas) recirculated from the exhaust system, and particularly, the EGR gas includes not only vapor and a carbon dioxide gas but also a variety of unburnt hydrocarbon molecules having different molecular weights, and therefore, calculation can be carried out individually with respect to these different gasses. However, since the gas components are not changed while the intake gas is being transported, the intake gas is assumed in this embodiment to have the two components of the fresh air and the EGR gas, so as to perform the calculation with respect to these two components. When data of the calculation result (i.e., the variable p, $\rho$, u or T) is transferred to another program, a sum or an average of the calculation results of the two gas components is used for obtaining the variable p, $\rho$, u or T of the whole intake gas.

Also, when the flow of the intake gas is changed from the one dimensional flow to the three dimensional flow, the variable p, $\rho$, u or T of the intake gas obtained as described above is uniform along the cross section of the intake gas flow of the one dimensional flow, and therefore, these variables can be directly given as initial conditions or boundary conditions for the three dimensional CFD operation. On the other hand, when the flow of the intake gas is changed from the three dimensional flow to the one dimensional flow, each of the variables p, $\rho$, u and T indicating the state of, for example, the three dimensional intake gas flow is averaged along the cross section of the flow, so as to be given as initial conditions or boundary conditions for the one dimensional CFD operation. In other words, the dimension of the CFD operation is switched in a manner that the variables p, $\rho$, u and T of the flow are uniform to some extent along its whole cross section, so that sufficiently accurate simulation can be carried out even when the variables are thus transformed.

Figure 3:
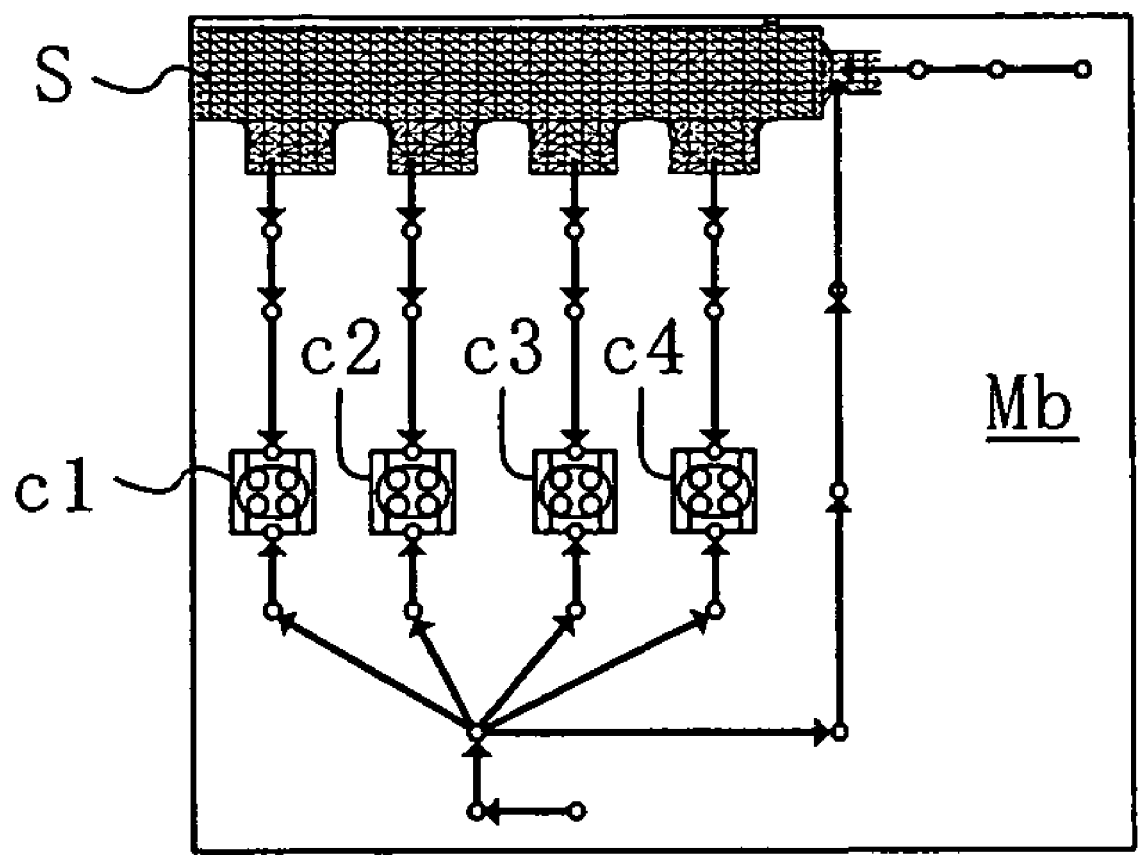
FIG. 3 is a diagram for showing a conventional model in which a surge tank is three dimensionally simulated.

In this manner, the three dimensional model is used in a specified section in the part extending from the intake system to the exhaust system of the engine, and the three dimensional CFD operation is carried out in the specified section with respect to a stroke previously selected from the intake, compression, expansion and exhaust strokes, with the other sections and the other strokes assumed to be a zero dimension or a one dimension. Thus, the computational complexity for the simulation can be largely reduced while keeping the accuracy of the simulation, so as to reduce the time required for the analysis. Specifically, as compared with the conventional system in which the model for three dimensionally expressing the whole surge tank is used and the one dimensional and three dimensional CFD operations are performed over all the intake, compression, expansion and exhaust strokes as exemplified in FIG. 3, the computational complexity of the system according to this embodiment is reduced to substantially ¼.

In addition, in this embodiment, the flow of the intake gas, that is, a working fluid of the engine, is not calculated with respect to each of all the gas components but the CFD operation is performed with the intake gas assumed to have the two components of the fresh air and the EGR gas. Also from this point, the computational complexity can be largely reduced so as to reduce the analysis time.

(Chemical Reaction Simulation)

The flows of the intake/exhaust gas in the intake and exhaust strokes of each cylinder is simulated by using the CFD as described above. In addition, in this embodiment, with respect to a cylinder in the compression or expansion stroke, chemical reaction simulation for simulating the combustion state is performed with the movement of the air fuel mixture and the combustion gas within the cylinder ignored. Specifically, the state of the intake gas (namely, the fresh air and the EGR gas) to be filled in the combustion chamber of the cylinder, namely, the pressure p, the density $\rho$, the velocity u and the temperature T, is first obtained through the one dimensional and three dimensional CFD operations as described above. At this point, taking it into consideration that a time of the cylinder reaching the bottom dead center is different from the close time of the intake valve, blow back of the intake gas having once entered the cylinder is also simulated in the CFD operation, so that the state of the intake gas filled in the cylinder can be accurately obtained.

In this manner, the pressure p and the temperature T of the combustion chamber at the initial stage of the compression process can be obtained, and the strength of the flow within the cylinder can be obtained from the velocity u of the intake gas. Furthermore, the proportion of the EGR gas in the intake gas can be obtained. On the other hand, the air fuel ratio of the air fuel mixture (or the amount of fuel supplied to the cylinder), the amount of burnt gas (internal EGR gas) remaining in the combustion chamber, the temperature of the cylinder wall and the like can be obtained on the basis of the running state of the engine (such as the engine load and the rotational speed) employed in the simulation. In other words, in this embodiment, a map in which the values of physical quantities such as the air fuel ratio, the amount of internal EGR gas and the temperature of the cylinder wall are previously set correspondingly to the running state of the engine is prepared, so that values of a plurality of physical quantities can be read from the map on the basis of the running state of the engine employed in the simulation.

Then, when the values of a plurality of physical quantities indicating the state of the combustion chamber including the amount of EGR gas within the intake gas and the like attained at the initial stage of the compression stroke are obtained on the basis of the result of the CFD operation and the engine running conditions as described above, a group of gas components corresponding to the group of the physical quantities is read from the chemical reaction DB 12. Thus, the components of the working gas used in the chemical reaction simulation can appropriately reflect the simulation of the flow by using the CFD and the engine running conditions.

Figure 4:
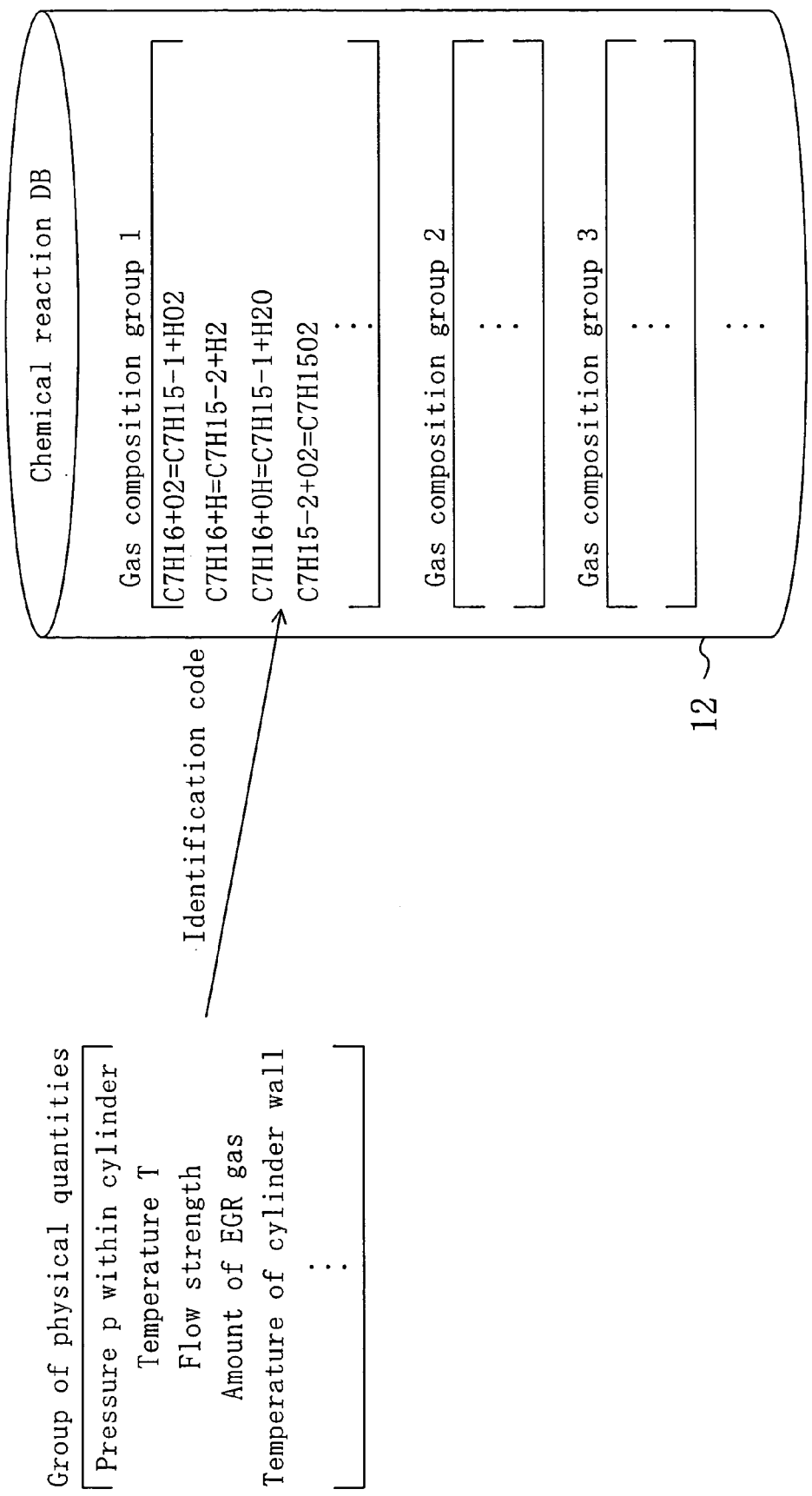
FIG. 4 is an explanatory diagram for showing correspondence between a group of physical quantities indicating the state in a cylinder and data group of gas components stored in a chemical reaction DB.

As the data of the gas component groups stored in the chemical reaction DB 12, among various hydrocarbons mainly supplied as a fuel, nitrogen and oxygen included in the air, and hydrocarbon, carbon dioxide, vapor and the like included in the EGR gas, typical groups corresponding to the groups of the physical quantities indicating the states of the cylinder are stored together with reaction formulas as exemplified in FIG. 4. Specifically, the number of kinds of chemical seeds and their reaction formulas concerned with the combustion of an engine are generally approximately 3000 or more (as shown in FIG. 5), and if all of these chemical seeds are to be calculated, the computational complexity is enormous and hence the time required for the simulation is uselessly elongated.

However, when not all the chemical reactions are employed but chemical reactions particularly significant for simulating the combustion state, namely, typical chemical reactions for simulating the combustion, are employed, the number is several tens through several hundreds at most. Therefore, in this embodiment, a predetermined number (of, for example, 100) or less of typical chemical reactions that are changed depending upon the engine running state are extracted, and typical gas components corresponding to the extracted reactions alone are stored in the chemical reaction DB 12. Thus, the number of gas components used in the chemical reaction simulation is appropriate, so that the computational complexity can be largely reduced while keeping desired accuracy. Also, the size of the chemical reaction DB 12 can be thus appropriate.

Then, on the basis of the groups of the gas components (chemical seeds) extracted as described above, first, in the compression stroke of the cylinder, considering that as the piston is elevated, the pressure p within the combustion chamber is increased and the temperature T is accordingly increased and that the heat is given off through heat exchange with the inner wall of the cylinder, the reactions of the respective gas components caused under these conditions are successively described. Through the simulation of the chemical reactions caused in this compression stroke, a low-temperature flame caused before spark ignition in the cylinder and occurrence of pre-ignition can be replayed.

Also, ignition of the air fuel mixture attained by the spark ignition is simulated in the vicinity of a compression top dead center, so that the progress of the resultant chemical reactions (combustion) is successively described in consideration of the increase of the capacity of the combustion chamber through the expansion stroke of the cylinder until completion of the expansion stroke. Then, on the basis of the compositions of the burnt gas within the cylinder, the total heat value and the heat exchange with the inner wall of the cylinder, work load applied to the piston, the increase of the capacity of the combustion chamber resulting from the lowering of the piston and the like obtained as a result of the chemical reaction simulation of the expansion stroke, the variables p, ρ, u and T indicating the state of the burnt gas (exhaust gas) exhausted from the combustion chamber when the cylinder is proceeded to the exhaust stroke are obtained. These variables are given as the boundary conditions for the flow of the exhaust gas to be used in the CFD operation program. It is noted that the density ρ of the exhaust gas is obtained in accordance with the compositions of the burnt gas in the cylinder. Also, since it is assumed that the gas filled within the cylinder does not move in the compression and the expansion strokes, the initial value of the velocity u of the flow of the exhaust gas is zero.

The compositions of the burnt gas within the cylinder obtained through the chemical reaction simulation as described above are also used for updating the chemical reaction DB 12. Specifically, the data of the groups of the gas components stored in the chemical reaction DB 12 are determined correspondingly to the pressure p within the cylinder, the temperature T and the proportion of the EGR gas in the intake gas as described above, and the compositions of the EGR gas used as the base of the data are previously obtained through experiments and the like. In this embodiment, the gas components of the data are corrected by a given method on the basis of the compositions of the exhaust gas obtained as a result of the chemical reaction simulation as described above.

Specifically, the exhaust gas obtained by the simulation may be directly regarded as the EGR gas, so that the proportions of hydrocarbon, carbon monoxide and nitrogen oxides can be corrected by giving appropriate weights in the data of the groups of the gas components corresponding to the engine running states stored in the chemical reaction DB 12. Through such correction, the data of the gas components can be corrected on the basis of the results of the CFD operation and the chemical reaction operation, so that the accuracy of the chemical reaction simulation can be further improved.

(Outline of Simulation)

Next, procedures in the simulation performed by the predictive analysis system A for the engine performance according to this embodiment will be specifically described. First, as shown in the outline of a main program of FIG. 6, an operator performs a predetermined input operation in accordance with screen display and the like in any of the PC terminals 5, so as to input initialization data for the engine simulation (in step S1). For example, in the case of the four-cylinder engine shown in FIG. 2, geometric data corresponding to the dimensions and the shapes of the intake and exhaust systems, the combustion chambers and the like of the engine and physical data corresponding to the physical characteristics such as thermal conductivity are input, or instead of these detailed data, codes for specifying data of the engine stored in the experiment DB 13 and the design DB 14 are input, and the range and the like of the engine running conditions to be simulated are input to the PC terminal 5.

Furthermore, the operator is made to select in which section of the engine the three dimensional model is to be employed, and to select which of the one dimensional and three dimensional CFD operations is to be performed on the selected section in the intake stroke and the exhaust stroke of the cylinder. Specifically, when the analysis is performed for supporting the design development of the intake system of the engine, the operator selects to use the three dimensional models for the surge tank as shown in FIG. 2 and selects to perform the three dimensional CFD operation on this section in the intake stroke of each cylinder. Thus, the flow of the intake gas from the surge tank to each independent intake gas passage is analyzed as a three dimensional flow, so that the physical characteristic values of the engine such as the volumetric efficiency can be accurately obtained regardless of change of the load and the rotational speed of the engine. In this manner, the performance characteristics such as the engine output can be accurately predicted.

Next, in step S2, models to be used in the simulation are constructed in accordance with the initialization data input in step S1 and the resultant models are once stored. Specifically, for example, as shown in FIG. 2, a one dimensional CFD model Mb extending from a part of the intake system to a part of the exhaust system and three dimensional CFD models s1 through s4 corresponding to the portions of the surge tank divided with respect to the respective cylinders c1 through c4 are constructed to be stored in the internal storage device of the operation servers 1. Also, with respect to the chemical reaction simulation, a model of the tank for defining change of the capacity of each cylinder in accordance with change of the crank angle, change of the thermal conductivity in accordance with the temperature of the inner wall of the cylinder and the like is constructed. This tank model is a zero dimensional physical model in a sense that it is assumed that the air fuel mixture and the burnt gas do not move within the tank.

More specifically, when the three dimensional CFD model is constructed, for example, three dimensional design CAD data corresponding to the shape of the surge tank is read from the design DB 14 to the PC terminal 5 on the basis of the initialization data, and a model construction command is created by adding data for specifying information about a boundary and a mesh to the design CAD data, and the resultant is sent to the operation servers 1. In the operation servers 1 having received this command, the pre-processor is activated, so as to adhere a layer mesh (grid) in a predetermined dimension on the inner wall or generate an internal mesh (grid) in each section of the surge tank in accordance with the shape of the section.

Alternatively, when another model construction command is sent on the basis of the initialization data from the PC terminal 5 to the operation servers 1, the operation servers 1 having received this command read data of a template component corresponding to the basic shape of the surge tank from the component DB 11, and construct a three dimensional model having a mesh to be used for the CFD operation by modifying the dimension, the shape and the like of the template component of the read data.

In the three dimensional CFD model, a mesh of the design CAD data can be directly used. Also, in a three dimensional model of a variable mechanism such as a throttle valve, the operation state of the valve can be simulated by moving, adding or eliminating a mesh formed on the valve.

By using the models constructed in the aforementioned manner, a simulation operation is performed for simulating the flow of the intake/exhaust gas and the state of the combustion within the combustion chamber during the running of the engine in a given dimension in each of the intake, compression, expansion and exhaust strokes. In this embodiment, this operation processing is executed, for example, by executing the one dimensional and three dimensional CFD operations and the chemical reaction simulation simultaneously in parallel by the operation servers 1 while transferring data files and execution files of the programs mutually between the PC terminal 5 and the operation servers 1.

For example, in the CFD operation, the model Mb for the one dimensional CFD operation is read (in step S31), and the initial conditions at the start of the simulation, namely, the variables $p$, $\rho$, $u$ and $T$ of the intake/exhaust gas flow and the engine running state, are input (in step S32), based on which the numerical calculation of the conservation expressions of a one dimensional flow is carried out (in step S33). Specifically, the states (i.e., the variables $p$, $\rho$, $u$ and $T$) of the intake and exhaust gases passing from the downstream of the throttle valve to the exhaust gas passage through the combustion chambers of the respective cylinders c1 through c4 attained when the crank angle is changed by a small angle from the start of the simulation are calculated along the flows.

At this point, when the first cylinder c1 is in the intake stroke as shown in FIG. 21, in the section s1 of the surge tank corresponding to the first cylinder c1, the one dimensional operation is once stopped after obtaining the state (the variables $p$, $\rho$, $u$ and $T$) of the flow on the boundary between the one dimensional flow and the three dimensional flow, and the result of the operation is transferred to the PC terminal 5 as a data file. The PC terminal 5 having received this data file transforms the data of the one dimensional flow into data of a three dimensional flow, creates an execution file for the three dimensional CFD program and sends the created execution file to the operation servers 1. The operation servers 1 having received this execution file activate the three dimensional CFD program. First, the three dimensional model s1 of the surge tank corresponding to the first cylinder c1 is read (in step S41), initial conditions (the above-described boundary conditions) are input (in step S42) so as to perform numerical calculation of the three dimensional flow, and stores the result of the calculation (in step S43). In the calculation result, data of the variables ($p$, $\rho$, $u$ and $T$) of the flow on the boundary between the surge tank and the independent intake gas passage on the downstream of the surge tank is transferred to the PC terminal 5, and the three dimensional data is transformed into one dimensional data to be sent back to the operation servers 1.

Then, the one dimensional CFD program is restarted on the basis of the sent data, so as to calculate the flow of the intake/exhaust gas from the independent intake gas passage to the combustion chamber of the first cylinder c1 and further to the exhaust gas passage downstream and store the result of the calculation (in step S33). In this manner, the states ($p$, $\rho$, $u$ and $T$) of the intake and exhaust gases attained when the crank angle is changed by a small angle from the start of the simulation are calculated over the model Mb of the engine, and the results of the calculation are stored.

Thereafter, although described in detail below, at predetermined timing, a part of the result data of the CFD operation is rewritten on the basis of the result of the chemical reaction simulation (in step S34; transformation, submission and rewrite of data), and then, after the crank angle of the engine is proceeded by a small angle (in step S35; increment), it is determined whether or not the crank angle has become an angle set as the end of the simulation (in step S36), and the flow returns to step S33 until the crank angle becomes the simulation end angle, so as to repeatedly execute the one dimensional and three dimensional CFD operations. In this manner, the flow of the intake/exhaust gas of the engine is stored correspondingly to the change of the crank angle.

Although not shown in the drawings, the boundary conditions (the variables $p$, $\rho$, $u$ and $T$) of the intake gas flow adjusted by the throttle valve of the engine are substantially uniform in a stationary running state. Also, in a transient state when the running state of the engine is changed, the change (transient change) of the opening of the throttle valve at each set crank angle in accordance with the change of the running state is separately given by a control operation program for simulating a control logic of the engine.

Figure 7:
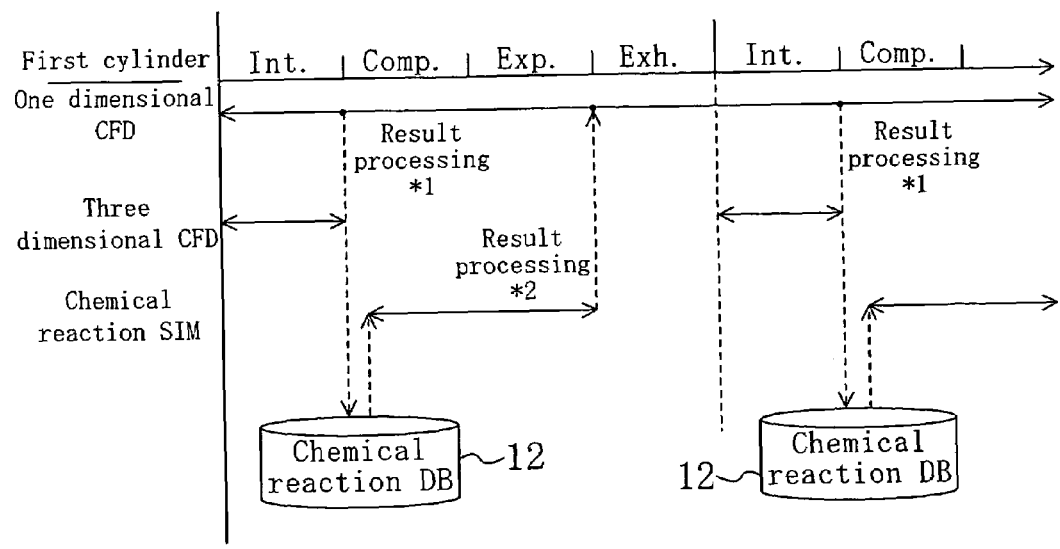
FIG. 7 is an explanatory diagram for schematically showing switching between CFD and chemical reaction simulation and data transfer accompanying the switching.
Figure 7:
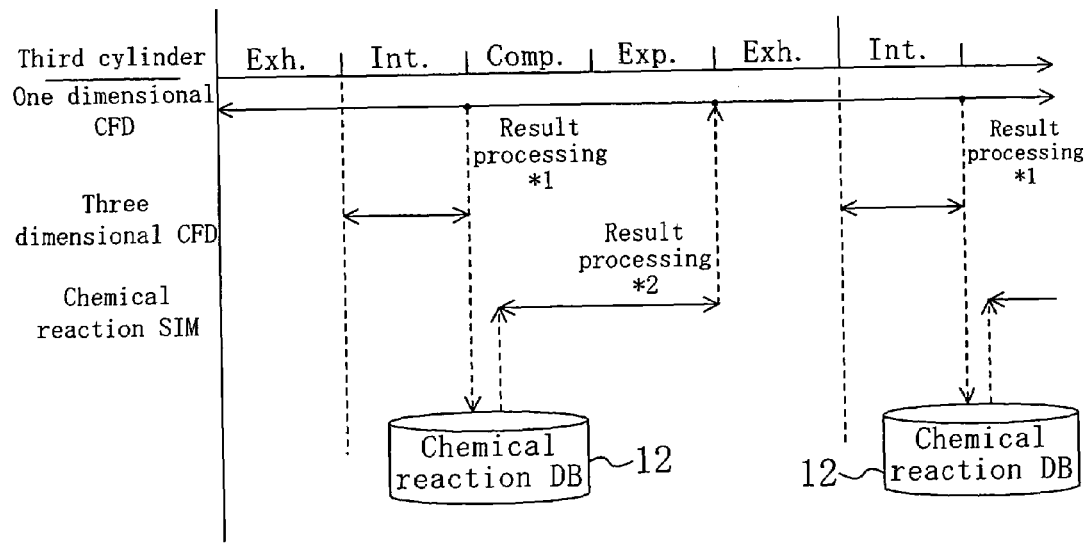

In parallel to the aforementioned CFD operations, the chemical reaction simulation (chemical reaction SIM) is performed on each cylinder in the compression or expansion stroke. Specifically, when, for example, the first cylinder c1 is proceeded from the intake stroke to the compression stroke in accordance with the progress of the simulation, the data resulting from the CFD operations is transferred from the operation servers 1 to the PC terminal 5 as schematically shown in FIG. 7. The PC terminal 5 having received this data obtains, on the basis of the data, the pressure $p$, the temperature $T$ and the like of the intake gas filled in the first cylinder c1 and the proportion of the EGR gas included in the intake gas, and reads values of the physical quantities such as the air fuel ratio and the temperature of the cylinder wall from the map on the basis of the current running state of the engine, so as to specify a group of the physical quantities corresponding to the state within the cylinder, and sends an execution file of the chemical reaction simulation program together with an identification code corresponding to this group of the physical quantities to the operation servers 1 (which data transfer between the operation programs is shown in the drawing as "result processing *1").

Figure 6:
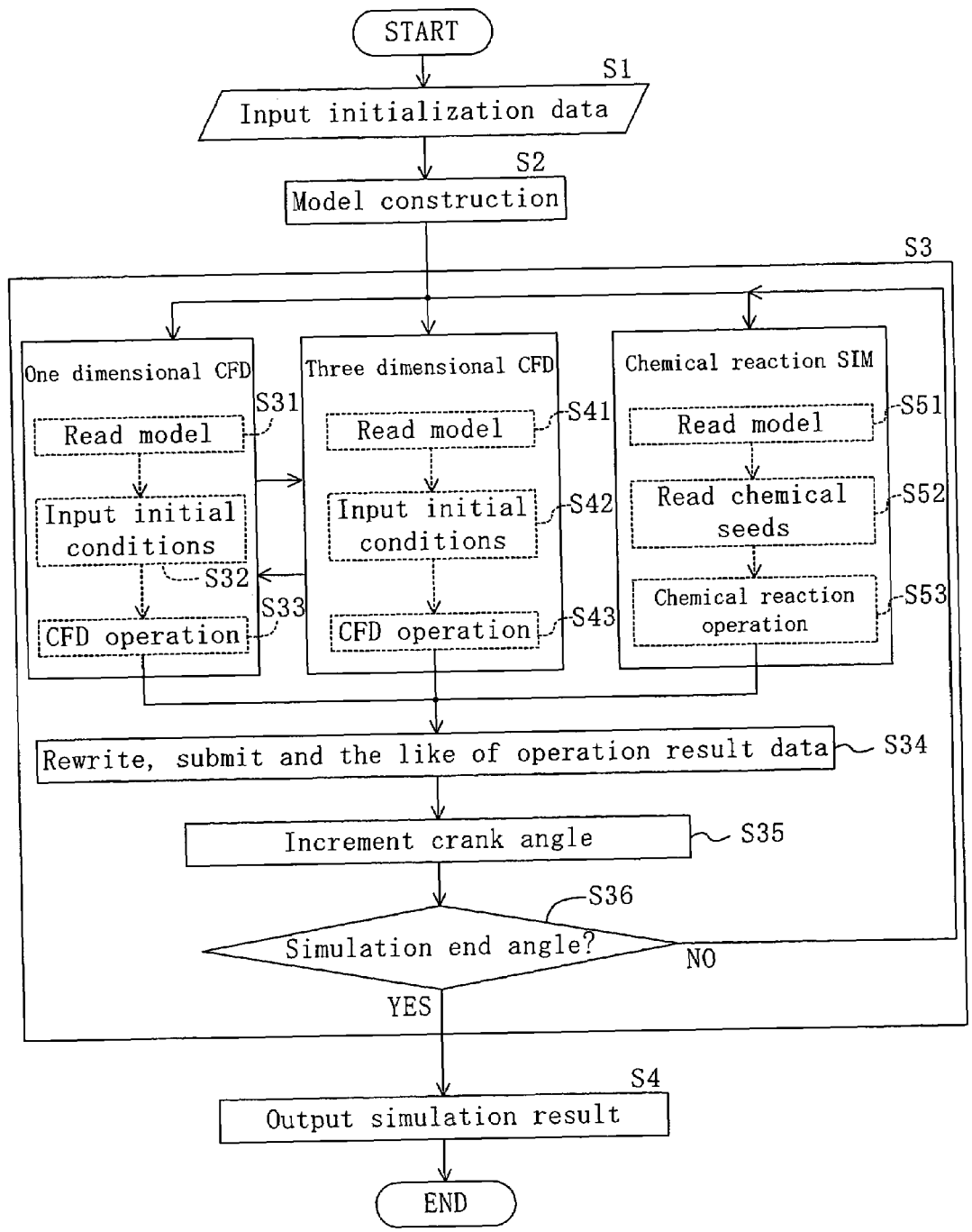
FIG. 6 is a flowchart for roughly showing procedures in simulation.

In the operation servers 1 having received the execution file, the chemical reaction simulation program is executed. Thus, as shown in the flowchart of FIG. 6, the tank model of the first cylinder c1 is read from the storage device (in step S51), data of a group of gas components corresponding to the group of the physical quantities having the identification code is read from the chemical reaction DB 12 (in step S52; read of chemical seeds), and describes and stores chemical reactions of the gas components within a range of a small crank angle previously set (in step S53; chemical reaction operation). Such an operation of the chemical reaction formulas is repeatedly carried out at every small crank angle from the initial stage of the compression stroke to the end of the expansion stroke of the cylinder c1. Thus, data describing the states of the working gas in the compression and expansion strokes within the combustion chamber of the first cylinder c1 in time series is stored as the result of the chemical reaction operation in the storage device.

Then, when the first cylinder c1 is proceeded to the exhaust stroke after completing the expansion stroke, the chemical reaction simulation for the cylinder c1 is completed, and data about the compositions of the burnt gas (exhaust gas) exhausted from the combustion chamber of the first cylinder c1 and the heat caused by the combustion, the work load and the like is sent from the operation servers 1 to the PC terminal 5 as shown as "result processing *2" in FIG. 7. The PC terminal 5 having received this data obtains the variables p, ρ, u and T indicating the initial state of the exhaust gas flow on the basis of the compositions of the burnt gas (exhaust gas) exhausted from the combustion chamber of the first cylinder c1, the heat caused by the combustion, the work load and the like, creates a command for rewriting the operation result data of the CFD operation on the basis of the obtained variables, and sends the created command to the operation servers 1.

Then, the operation servers 1 having received the command rewrites a combustion portion of the operation result data of the one dimensional CFD operation, namely, a portion of the result data corresponding to the compression stroke and the expansion stroke, in step S34 of the flowchart of FIG. 6, and the data about the initial state of the exhaust gas flow is used as the boundary conditions of the exhaust gas flow for the one dimensional CFD operation. Also, the data of the gas components stored in the chemical reaction DB 12 is corrected on the basis of the compositions of the exhaust gas.

As described above, in step S3 of the main program, the CFD operations and the chemical reaction simulation operation are carried out in synchronization with the change of the crank angle of the engine from the start to the end of the simulation. When the crank angle set as the end of the simulation is attained (namely, YES in step S36), the flow proceeds to step S4, where the result of the simulation is output, and then, the control is completed (END). As the output of the simulation result performed in step S4, desired portions of the data about time series operation result stored in the storage device of the operation servers 1 are read and transferred to the PC terminal 5, so that predetermined evaluation values for the engine performance can be output on the basis of the transferred data. Specifically, for example, the output characteristic, the fuel expense characteristic and change of the volumetric efficiency of each cylinder caused by the change of the engine running state are graphed, and the resultant graph is displayed on the display of the operation server 1 or the PC terminal 5. Furthermore, with respect particularly to the flow of the intake gas within the surge tank, the result of the three dimensional CFD operation may be visualized to be displayed.

Step S1 of the flowchart of FIG. 6 corresponds to an inputting step of inputting the geometric data corresponding to the dimension and the shape of the combustion chambers of the engine and the physical data corresponding to the physical characteristics such as the thermal conductivity, namely, the dimension and at least one of physical characteristic values of a given section through which an intake gas or an exhaust gas, that is, a working fluid, passes. Also, this step S1 corresponds to a selecting step of selecting the dimension of a space where the movement of the working fluid is analyzed in each of the four strokes of the intake, compression, expansion exhaust strokes in the combustion cycle of a cylinder.

Furthermore, step S2 and steps S31, S41 and S51 in step S3 of the flowchart correspond to a model setting step of setting a physical model to be used for simulating the movement of the working fluid from at least a part of the intake system to a part of the exhaust system of the engine in the selected dimension in each of the intake, compression, expansion and exhaust strokes of each cylinder of the engine.

Moreover, steps S33 through S36 and S43 in step S3 correspond to an operating step of executing, by using the physical model, the CFD operation for simulating the movement of the working fluid of the engine, and in particular, step S34 corresponds to a data transforming step of transforming, when the dimension of the space for simulating the movement of the working fluid of the engine is changed, values of the variables describing the flow of the working fluid in accordance of the change of the dimension.

Furthermore, step S4 of the flowchart corresponds to an outputting step of outputting an output about the performance of the engine on the basis of the results of the CFD operation and the chemical reaction simulation operation performed in step S3.

In the predictive analysis system A of this embodiment, when the PC terminal 5 executes step S1 of the flowchart, the PC terminal 5 works as selecting means for allowing an operator to select the dimension of the space where the movement of the working fluid is analyzed in each of the four strokes of the intake, compression, expansion and exhaust strokes of the engine.

Also, when the operation servers 1 execute steps S2 and S3, the operation servers 1 work as model setting means for setting the physical model to be used for simulating the movement of the working fluid from at least a part of the intake system to a part of the exhaust system of the engine in the selected dimension in each stroke and operating means for executing, by using the physical model, the CFD operation for simulating the movement of the working fluid of the engine.

Furthermore, when the operation servers 1 and the PC terminal 5 execute step S4 of the flowchart, the operation servers 1 and the PC terminal 5 correspond to outputting means for outputting an output about the performance of the engine on the basis of the result of the CFD operation.

Accordingly, in the predictive analysis system A for the engine performance according to this embodiment, in the case where, for example, the flow of an intake/exhaust gas of a four-cycle engine is analyzed through the application of the CFD, while basically using the one dimensional engine model Mb, the three dimensional models s1 through s4 are used in previously selected sections, so that the one dimensional operation or the three dimensional operation can be selected with respect to the intake and the exhaust strokes of each cylinder. Therefore, the performance characteristics such as the output and the fuel expenses of the engine can be sufficiently accurately predicted, and the necessary computational complexity can be largely reduced.

Also, with respect to the compression and expansion strokes of each cylinder, the combustion state is simulated by the chemical reaction simulation with the flow of the gas at least within the combustion chamber ignored. In this simulation, typical chemical reactions alone are selected from massive chemical reactions, so that the necessary computational complexity can be largely reduced while keeping the accuracy of the simulation.

Moreover, even when a part of the exhaust gas (EGR gas) is recirculated to the intake gas, the flow of the intake gas is not calculated with respect to respective gas components but the operation is performed by assuming that the intake gas has two components of the fresh air and the EGR gas. Also thus, the computational complexity of the CFD operation can be largely reduced.

Specifically, while keeping the accuracy of the simulation necessary for the prediction of the engine performance, the necessary computational complexity is reduced as much as possible, so that the time required for the analysis can be reduced. In this manner, the utility as a design/development tool can be improved.

Alternative Embodiments

It is noted that this invention is not limited to the aforementioned embodiment but can be practiced also in various other embodiments. Specifically, although the three dimensional CFD operation is performed with respect to the surge tank of the intake system in the above-described embodiment, this does not limit the invention, and, for example, the shape of the whole intake port or the shape of a portion communicated with the combustion chamber in the vicinity of the opening of the intake port may be three dimensionally simulated.

Figure 8A:
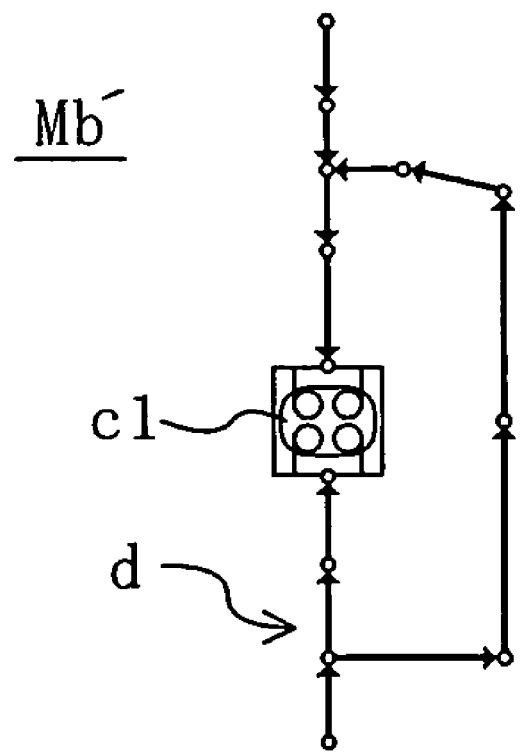
FIGS. 8A and 8B are diagrams of an engine model according to another embodiment in which one dimensional and three dimensional CFD operations are performed in an exhaust stroke.
Figure 8B:

Alternatively, a part of the exhaust system of the engine may be three dimensionally simulated as exemplified in FIGS. 8A and 8B. Specifically, in a single cylinder engine exemplified in FIG. 8A, a model Mb' for one dimensionally simulating a portion from the downstream of a throttle valve through a cylinder c1 to the inlet of a catalytic converter as in the aforementioned embodiment and a model d for three dimensionally simulating a portion where an EGR passage is branched from an exhaust gas passage as shown in FIG. 8B are prepared, so that the three dimensional CFD operation can be performed by using the model d with respect to the intake stroke of the engine. Thus, the flow of the exhaust gas toward the EGR passage can be accurately simulated regardless of the running state of the engine.

Alternatively, although not shown in the drawings, a three dimensional model of a combustion chamber within a cylinder may be prepared so as to perform the three dimensional CFD operation with respect to the compression stroke of the cylinder. Thus, the conservation and the attenuation of the flow within the cylinder in the compression stroke can be replayed so as to accurately predict the influence on the combustion.

Alternatively, the three dimensional model of the combustion chamber may be used for performing the three dimensional CFD operation also with respect to the expansion stroke. However, in the three dimensional CFD operation performed in this case, movement of the flow field, the fuel droplets and vapor within the combustion chamber and the reactions caused through the combustion are not all simulated, but this three dimensional CFD is a pseudo operation in which the distribution of an unburnt air fuel mixture and a burnt gas within the combustion chamber is simulated by the CFD operation to be combined with the chemical reaction simulation.

Furthermore, although the simulation is performed on the four-cycle engine in the aforementioned embodiment, it goes without saying that the simulation can be performed on another engine such as a two-cycle engine and a rotary piston engine.

As described so far, according to the predictive analysis system and the like for the engine performance of this invention, while keeping the accuracy in predicting the engine performance, necessary computational complexity is largely reduced so as to reduce the time required for the analysis. As a result, the utility of the system and the like as the design/development tool can be sufficiently improved, and hence, the invention is useful particularly for design and development of automobile engines.

What is claimed is:

1. A predictive analysis system for predicting performance of an engine by analyzing movement of a working fluid of the engine through application of CFD, comprising:
    selecting means for allowing an operator to select a dimension of a space where the movement of said working fluid is analyzed with respect to each of four processes of intake, compression, expansion and exhaust processes in a combustion cycle of the engine;
    model setting means for setting a physical model used for simulating the movement of said working fluid at least from a part of an intake system to a part of an exhaust system of the engine in said dimension selected with respect to each of said four processes; and
    operating means for describing the movement of said working fluid of the engine through a CFD operation using said physical model.

2. The predictive analysis system of claim 1,
    wherein it is selectable by said selecting means whether the movement of said working fluid is assumed to be a one dimensional flow or a three dimensional flow in said intake process of the engine.

3. The predictive analysis system of claim 1,
    wherein it is selectable by said selecting means whether the movement of said working fluid is assumed to be a one dimensional flow or a three dimensional flow in said exhaust process of the engine.

4. The predictive analysis system of claim 1,
    wherein it is selectable by said selecting means whether the movement of said working fluid is assumed to be a one dimensional flow or a three dimensional flow in said intake and exhaust processes of the engine, and
    said model setting means sets a physical model in said selected dimension with respect to said intake or exhaust process of the engine and sets a zero dimensional physical model with respect to said compression and expansion processes assuming that said working fluid does not move at least in a combustion chamber of the engine in said compression and expansion processes.

5. The predictive analysis system of claim 1,
    wherein said model setting means sets a three dimensional physical model for a section of a portion extending from at least a part of the intake system to a part of the exhaust system of the engine and sets a one dimensional physical model for another section of said portion.

6. The predictive analysis system of claim 1, further comprising a database where design CAD data of engines are accumulated,
wherein said model setting means constructs a physical model on the basis of data read from said database.

7. The predictive analysis system of claim 1, further comprising a database of component models each of which simulates a basic shape of a given section for allowing said working fluid of the engine to pass and is changeable in a dimension, a shape and at least one of physical characteristic values,
wherein said model setting means accepts input of data about the dimension and at least one of physical characteristic values of said given portion, reads a corresponding component model from said database, and constructs a physical model for use in the CFD operation by modifying said component model on the basis of said input data.

8. The predictive analysis system of claim 1,
wherein when said dimension of the space where the movement of said working fluid of the engine is simulated is changed, said operating means transforms values of variables used for describing the movement of said working fluid in accordance with the change of said dimension.

9. The predictive analysis system of claim 1, further comprising outputting means for outputting an output about the performance of the engine on the basis of a result of the CFD operation performed by said operating means.

10. A control program for a computer system for predicting performance of an engine by analyzing movement of a working fluid of the engine through application of CFD, comprising:
a selecting step of selecting a dimension of a space where the movement of said working fluid is analyzed with respect to each of four processes of intake, compression, expansion and exhaust processes in a combustion cycle of the engine;
a model setting step of setting a physical model for use in simulating the movement of said working fluid from at least a part of an intake system to a part of an exhaust system of the engine in said dimension selected with respect to each of said four processes; and
an operating step of describing the movement of said working fluid of the engine by a CFD operation using said physical model.

11. The control program of claim 10,
wherein it is selectable in the selecting step whether the movement of said working fluid is assumed to be a one dimensional flow or a three dimensional flow in said intake process of the engine.

12. The control program of claim 10,
wherein it is selectable in the selecting step whether the movement of said working fluid is assumed to be a one dimensional flow or a three dimensional flow in said exhaust process of the engine.

13. The control program of claim 10,
wherein it is selectable in the selecting step whether the movement of said working fluid is assumed to be a one dimensional flow or a three dimensional flow in said intake and exhaust processes of the engine, and
in the model setting step, a physical model of said selected dimension is set with respect to said intake or exhaust process of the engine and a zero dimensional physical model is set with respect to said compression and expansion processes by assuming that said working fluid does not move at least in a combustion chamber of the engine in said compression and expansion processes.

14. The control program of claim 10,
wherein in the model setting step, a three dimensional physical model is set for a section of a portion extending from at least a part of the intake system to a part of the exhaust system of the engine and a one dimensional physical model is set for another section of said portion.

15. The control program of claim 10,
wherein in the model setting step, desired data is read from a database where design CAD data of engines are accumulated, and a physical model is constructed on the basis of data read from said database.

16. The control program of claim 10,
wherein a database of component models each of which simulates a basic shape of a given section for allowing said working fluid of the engine to pass and is changeable in a dimension, a shape and at least one of physical characteristic values is prepared,
said control program further comprises an inputting step of inputting data about the dimension and at least one of physical characteristic values of said given section, and
in the model setting step, a corresponding component model is read from said database, and a physical model for use in the CFD operation is constructed by modifying said component model on the basis of said input data.

17. The control program of claim 10,
wherein when said dimension of the space where the movement of said working fluid of the engine is simulated is changed, the operating step includes a data transforming sub-step of transforming values of variables used for describing the movement of said working fluid in accordance with the change of said dimension.

18. The control program of claim 10, further comprising an outputting step of outputting an output about the performance of the engine on the basis of a result of the CFD operation performed in the operating step.

* * * * *

UNITED STATES PATENT AND TRADEMARK OFFICE
CERTIFICATE OF CORRECTION

| | | |
|---|---|---|
| PATENT NO. | : 7,017,399 B2 | Page 1 of 1 |
| APPLICATION NO. | : 10/769862 | |
| DATED | : March 28, 2006 | |
| INVENTOR(S) | : Hideaki Yokohata et al. | |

It is certified that error appears in the above-identified patent and that said Letters Patent is hereby corrected as shown below:

TITLE PAGE,

ITEM (56),   References Cited: please add

-- JP 2002-526762, August 20, 2002,
  (U.S. Patent 6, 397,669)--; and

--WO 00/20833, April 13, 2002, Raichle et al--.

Signed and Sealed this

Fifth Day of September, 2006

JON W. DUDAS
*Director of the United States Patent and Trademark Office*